(12) United States Patent
Hempsch et al.

(10) Patent No.: US 10,780,814 B2
(45) Date of Patent: Sep. 22, 2020

(54) METHOD FOR DELIVERY AND/OR COLLECTION OF AT LEAST ONE MAILING

(71) Applicants: Christoph Hempsch, Bonn (DE); Daniel Meyer, Bonn (DE); Jörg Salomon, Bonn (DE); Farhad Shahed, Cologne (DE); Thomas Vogel, Düsseldorf (DE)

(72) Inventors: Christoph Hempsch, Bonn (DE); Daniel Meyer, Bonn (DE); Jörg Salomon, Bonn (DE); Farhad Shahed, Cologne (DE); Thomas Vogel, Düsseldorf (DE)

(73) Assignee: Deutsche Post AG, Bonn (DE)

( * ) Notice: Subject to any disclaimer, the term of this patent is extended or adjusted under 35 U.S.C. 154(b) by 662 days.

(21) Appl. No.: 14/705,135

(22) Filed: May 6, 2015

(65) Prior Publication Data
US 2015/0321595 A1    Nov. 12, 2015

(30) Foreign Application Priority Data
May 12, 2014  (DE) .................. 10 2014 106 689

(51) Int. Cl.
*B60P 3/00* (2006.01)
*A47G 29/12* (2006.01)

(52) U.S. Cl.
CPC .......... *B60P 3/007* (2013.01); *A47G 29/1209* (2013.01)

(58) Field of Classification Search
CPC .. B60P 1/6418; B60P 1/54; B60P 3/07; B60P 3/007; G06Q 10/083; B65G 1/1375; B65G 2209/06; B65G 51/28; B65G 51/30; B65G 51/32; B65G 51/34; B65G 51/04; B65F 1/1484; B65F 3/02; B65F 3/04; A47G 29/12; A47G 29/14; A47G 29/1203; A47G 29/1207; A47G 29/1209; A47G 29/12095; A47G 29/12097; A47G 29/16; A47G 2029/142; A47G 2029/144; A47G 2029/148
See application file for complete search history.

(56) References Cited

U.S. PATENT DOCUMENTS 1,738,894 A * 12/1929 Gulbransen .............. B61K 1/02
                                                    258/11
2,781,964 A *  2/1957 Ledgerwood ...... A47G 29/1209
                                                    232/17

(Continued)

FOREIGN PATENT DOCUMENTS

CA       2889533 A1 *  5/2014  ............... B65F 1/12
DE    690 02 643 T2     4/1994
                    (Continued)

*Primary Examiner* — Glenn F Myers
(74) *Attorney, Agent, or Firm* — Reinhart Boerner Van Deuren P.C.

(57) ABSTRACT

Described and shown is a method for delivery and/or collection of at least one mailing. In order to reduce the associated cost and effort a vehicle (1) is drives to at least one receptacle (3) through public traffic at least in part and the at least one mailing to be delivered is taken from the vehicle (1) and placed into the receptacle (3) by a transfer device attached to the vehicle (1) and/or the at least one mailing to be collected is brought from the receptacle (3) to the vehicle (1) by the transfer device attached to the vehicle (1).

27 Claims, 3 Drawing Sheets

(56) References Cited

U.S. PATENT DOCUMENTS

| | | | | |
|---|---|---|---|---|
| 2,819,110 | A * | 1/1958 | Redmon | B25J 1/04 294/104 |
| 3,263,943 | A * | 8/1966 | Share | B60P 3/03 232/16 |
| 3,294,342 | A * | 12/1966 | McClure | B65G 51/04 186/37 |
| 3,298,632 | A * | 1/1967 | Carson | B65G 51/04 406/112 |
| 3,507,409 | A * | 4/1970 | Gordon | B60P 3/03 109/1 R |
| 3,556,437 | A * | 1/1971 | Svedman | B65G 51/04 406/28 |
| 3,990,735 | A * | 11/1976 | Starz | B25J 1/04 294/209 |
| 3,995,754 | A | 12/1976 | DeKoning | |
| 4,023,843 | A * | 5/1977 | Coons | B25B 9/00 258/3 |
| 4,059,246 | A * | 11/1977 | Anders | B65G 51/04 406/31 |
| 4,111,282 | A * | 9/1978 | Vayda, Jr. | E04H 3/04 141/98 |
| 4,183,708 | A * | 1/1980 | Kuhbier | B60P 3/03 414/352 |
| 4,193,511 | A * | 3/1980 | Taber | B60R 99/00 193/8 |
| 4,249,853 | A | 2/1981 | Lyvers | |
| 4,297,071 | A | 10/1981 | Dunbar | |
| 4,678,390 | A * | 7/1987 | Bonneton | B65G 1/1375 294/4 |
| 5,088,644 | A * | 2/1992 | Scott | A47G 29/1216 104/177 |
| 5,174,689 | A * | 12/1992 | Kondolf, Jr. | B65G 51/26 406/112 |
| 5,215,412 | A * | 6/1993 | Rogoff | B65G 51/34 406/112 |
| 5,215,423 | A * | 6/1993 | Schulte-Hinsken | B65F 3/00 414/408 |
| 5,413,448 | A * | 5/1995 | Peshkin | B65F 1/1468 414/338 |
| 6,082,953 | A * | 7/2000 | Darley | B60P 3/03 414/390 |
| 6,729,808 | B1 * | 5/2004 | Nelson | B65G 51/18 406/11 |
| 8,615,322 | B2 * | 12/2013 | Thompson | G11B 15/689 414/273 |
| 8,682,471 | B2 * | 3/2014 | Starr | G11B 15/689 414/273 |
| 2005/0011816 | A1 * | 1/2005 | Zitting | B07C 3/008 209/584 |
| 2005/0119786 | A1 * | 6/2005 | Kadaba | B07C 3/00 700/224 |
| 2005/0121503 | A1 * | 6/2005 | Billings | A47G 29/1209 232/29 |
| 2013/0069382 | A1 * | 3/2013 | Dion | B60R 11/06 294/175 |
| 2014/0236446 | A1 * | 8/2014 | Spence | B65F 1/1484 701/70 |
| 2015/0006005 | A1 * | 1/2015 | Yu | G05D 1/0297 701/22 |

FOREIGN PATENT DOCUMENTS

| | | |
|---|---|---|
| DE | 195 32 070 A1 | 3/1997 |
| DE | 10 2012 208 578 A1 | 11/2013 |
| FR | 2 482 533 A1 | 11/1981 |
| FR | 2 672 551 A1 | 8/1992 |
| NL | 1 028 337 C2 | 8/2006 |
| WO | WO 94/15812 A1 | 7/1994 |
| WO | WO 2011/106787 A2 | 9/2011 |

* cited by examiner

METHOD FOR DELIVERY AND/OR COLLECTION OF AT LEAST ONE MAILING

CROSS-REFERENCE TO RELATED PATENT APPLICATIONS

This patent application claims priority to German Application No. 10 2014 106 689.8, filed May 12, 2014, the entire teachings and disclosure of which are incorporated herein by reference thereto.

FIELD OF THE INVENTION

The invention relates to a method for delivery and/or collection of at least one mailing.

BACKGROUND OF THE INVENTION

Various concepts are known for delivering and/or collecting mailings that differ with regard the respective mailing, for example. Mailings can generally involve different items that can be transported preferably with manageable cost and effort. More particularly, mailings may be individually packaged items. These not only include items in daily use, such as consumer products or food, but also technical items and equipment. In many cases, mailings are letters, parcels and/or flyers. Parcels also include small packages, whilst flyers can equally be leaflets, brochures or magazines. A letter can also be a postcard.

Such mailings are typically transported in a vehicle through public traffic and dropped by a delivery agent through the letterbox of the recipient. The delivery agent is an employee of a company that delivers letters, parcels and/or flyers, for example, whilst the recipient is a user of the services offered by said company and thus can be a customer.

In order to deliver parcels, the delivery agent generally has to ring the recipient's doorbell and hand the parcel to the recipient in person as letterboxes are not suitable for accommodating packages. If the recipient is not at home, the parcel can be given to a neighbour or left at a pick-up station also known as 'Packstation' (automated booth for self-service collection of parcels and oversize letters). Alternatively, the parcel can be left for collection from a service point. In such cases, the parcel recipient receives a notification that said recipient can use in to order collect the parcel. If parcels are to be sent, they can be handed over in a service point, collected from the sender by a company employee or left in a self-service collection booth by the sender. The parcels are then transported to the recipient through public traffic, for example.

Typically, fewer sophisticated concepts for delivery and/or collection are available in the case of mailings other than letters, parcels and flyers. Consequently, in most cases, such mailings are dealt with through direct handover from person to person.

Depending on the respective characteristics, existing methods for delivering and/or collecting mailings can be associated with significant cost and effort in terms of time, equipment and/or personnel.

SUMMARY OF THE INVENTION

The object of the present invention is therefore to develop and improve the method referred to and described in detail above such that the associated cost and effort can be reduced.

Said object is achieved according to claim 1 through a method of the kind referred to above,
in which a vehicle drives up to at least one receptacle through public traffic at least in part and
in which the at least one mailing to be delivered is placed into the receptacle by means of a transfer device attached to the vehicle and/or the at least one mailing to be collected is removed from the receptacle and placed in the vehicle by means of a transfer device attached to the vehicle.

According to the invention, a mailing is delivered and/or collected by means of a transfer device, wherein the transfer device is a part of the vehicle delivering the mailing or taking it away. In addition, the vehicle uses public roads, at least in part, to deliver the mailing and/or take it away. It is therefore not ruled out that the vehicle also drives on private property. However, driving to the receptacle also leads the vehicle through public roads. It may be preferred in this respect that the receptacle is provided close to a public road so that the vehicle is not required to leave the public road when driving up to the receptacle.

Driving up to the receptacle means that the vehicle drives to a position close to the receptacle. It is preferred here that the vehicle drives to a position a few metres away from the receptacle, in particular less than 10 m, more particularly less than 5 m, in order to place the mailing in the receptacle and/or remove a mailing from the receptacle. The vehicle can, however, drive roughly in the direction of the receptacle first, so that initially there is a greater distance between vehicle and receptacle, which may be up to 20 m or more, for example. However, distances of less than 10 m, more particularly less than 5 m, are then preferred. A further approach can take place subsequently, for example, an approach controlled by way of at least one sensor, to reduce the distance between the vehicle and the receptacle still further and consequently the transfer device for delivering and/or collecting the mailing is required to bridge a shorter distance.

Owing to the transfer device, delivery and/or collection directly by a person, such as the driver of the vehicle, is not required. The task of a person, such as an operator or driver, can be limited, for example, to driving the vehicle to the receptacle and once there, initiating where applicable, the transfer and/or collection of the mailing, by pressing a button or using another control command. The person can still also intervene as and where required. Using the transfer device essentially leads to a simplification of the process compared with the direct placement of the mailing into the receptacle and/or the direct removal of the mailing from the receptacle. For example, the driver no longer needs to get out of the vehicle. This can also speed up the delivery and/or collection of the at least one mailing.

In a basic scenario, the transfer device can simply be used to transport the mailing from the vehicle in the receptacle and/or from the receptacle to the vehicle. However, according to another embodiment, the transfer device can perform other tasks. It can be used to move a mailing, which is to be delivered to a receptacle and/or collected from a receptacle, inside the vehicle, for example. Here the transfer device can also select which mailing in a vehicle is moved and/or where the mailing is moved to inside the vehicle. Consequently, the transfer device has at least one transport device, such as in the form of a transfer unit, for transferring the mailing between the vehicle and the receptacle and/or vice versa. The transfer device, can, however, have other devices as required, more particularly transport devices, which are used to transport the mailing around on or inside the vehicle. This may be the case in particular if the transfer unit does not at least partially perform the task of transporting the mailing around on or inside the vehicle.

The transfer device is attached to the vehicle. Even though said connection can be configured to be detachable, the transfer device preferably does not act independently of the vehicle. The transfer device can therefore be configured to be removable from the vehicle, as required, in spite of the connection with the vehicle. The transfer device is therefore preferably not loosely transported on or in the vehicle in order to be unloaded from the vehicle for the purpose of transferring the mailing from the vehicle, for instance. The transfer device does not remain with the receptacle or the user of said receptacle. Nor is the transfer device part of the receptacle, although said receptacle may have devices that assist with the transfer of mailings. Consequently, the transfer device is not an aid for carrying the mailing either, which a person uses to carry the mailing from the vehicle to the receptacle and then to place the mailing into the receptacle. Preferably, the transfer device is to be considered rather as part of the vehicle.

Accordingly, in a preferred embodiment, the transfer device can be permanently attached to the vehicle. A permanent connection between a vehicle body and the transfer device is also considered a permanent connection between the transfer device and the vehicle. At the same time, the structure can be detachably attached to the vehicle. The vehicle can thus be configured, where required, such that a vehicle body attached to the transfer device can be replaced by another structure. The structure can be a so-called swap-body platform. The vehicle can be used in a more flexible manner by changing the vehicle body. It is therefore not an obligatory requirement due to the connection, more particularly the permanent connection between the transfer device and the vehicle, that the transfer device cannot be separated from the vehicle and/or the structure, not without causing damage and/or not without considerable effort.

To simplify matters, the vehicle according to the invention is more particularly a land vehicle, in the form of a motor vehicle, for instance. The vehicle can be a heavy goods vehicle or a delivery van, for example. The transfer device can also be permanently attached to a part of the vehicle that is not self-driven, in the form of a trailer, for instance, which is drawn by a towing vehicle. Lastly, the vehicle can therefore also be configured with multiple parts.

The at least one mailing can be an item in the form of individually packaged goods. More particularly, mailings can involve everyday items, such as consumables or food, as well as technical items and equipment. Preferably, the at least one mailing is a letter, parcel and/or flyer. The benefits of the method can be reaped to a particular extent in cases such as these. A flyer can also be a brochure, magazine and/or leaflet here, as required, whilst a parcel can also be a small package. A letter can also be a postcard.

Particular preference is afforded to situations where the mailing is a parcel. The delivery and/or collection of such mailings is associated with particular time and expense because parcels do not fit through letterboxes for instance. The receptacle can therefore be dimensioned such that it can accommodate parcels, provided said parcels do not exceed a specific size. In this respect, the receptacle is preferably a parcel box.

Several mailings can also be placed in the receptacle at the same time or one after another where required. Equally, several mailings can be removed from the receptacle at the same time or one after the other, if this serves to improve efficiency. Irrespective of this, the receptacle can be a parcel box, for example, i.e. a receptacle for the delivery of parcels.

In a first preferred embodiment of the method, the at least one mailing is taken out of the vehicle by the transfer device and placed into the receptacle and/or removed from the receptacle and placed in the vehicle. In this manner, the mailing can be protected from the weather, which is practical, especially if the mailing is at least a letter, parcel and/or a flyer. In principle, the mailing to be delivered and/or collected can also be stored in the vehicle. Consequently, an open vehicle, such as a vehicle with an open platform, can also be used.

In a particularly preferred embodiment, the receptacle is located on the border of a property, i.e. the property belonging to the mailing recipient. Preferably, the receptacle is positioned close to the boundary of the property. The border of the property is preferably less than 5 m, more preferably less than 2.5 m, and particularly preferred, less than 1.5 m wide, proceeding from the property boundary. This greatly facilitates access to the receptacle by the vehicle, and particularly if the respective property border in the region of the receptacle is adjacent to a, preferably public, road.

In order to access the receptacle, the vehicle can simply stop at the curbside alongside the property, more particularly the receptacle. This applies particularly in cases where the receptacle is provided on the border of the property. The remaining distance between the vehicle and the receptacle on the respective property can then be negotiated by the transfer device. Meanwhile, the vehicle sits either on the road and/or the pavement next to the respective property.

Taking a mailing from, more particularly out of, the vehicle and placing it in the receptacle by means of the transfer device and/or taking a mailing from the receptacle to, more particularly into, the vehicle by means of the transfer device, can be controlled at least in part by a control device. This can relieve the driver of responsibility, for example, and reduce the risk of operating error. At the same time, the control device can control at least one step performed by the transfer device at least in part, and consequently, for example, placing the mailing into the receptacle and/or removing the mailing from the receptacle, as well as the transportation of the mailing from the vehicle to the receptacle and/or in the opposite direction, can be controlled at least in part. Control by the control device can also relate to the transportation of a mailing to be delivered and/or collected. Alternatively, or additionally, 'by the control device' can also relate to the alignment of the transfer device or a part thereof, such as a transfer unit, relative to the receptacle. Where required, control can relate to the opening and/or closing of the receptacle or the locking and/or unlocking of the receptacle. Similarly, it is possible that the control device controls at least in part the locking and/or unlocking of the receptacle and a holder of the receptacle and, where applicable, the closure and opening of a closing mechanism linked to the respective locking mechanism. In any case, the driver is relieved of responsibility and operating errors are prevented.

In a particularly preferred embodiment, the at least one mailing is transported from, more particularly out of, the vehicle into the receptacle and/or from the receptacle to, more particularly into, the vehicle autonomously owing to the transfer device controlled by means of the control device, i.e. without manual intervention by a driver or operator. It is also conceivable that at least one specific step, such as precise alignment of a transfer device relative to the receptacle, the opening and/or closing of the receptacle as well as the locking and/or unlocking of the receptacle to/from a holder of the receptacle is performed autonomously.

Placing a mailing into the receptacle and/or removing a mailing from the receptacle and placing it into the vehicle can be controlled with the aid of the control device, essentially in accordance with different predefined criteria. The criteria can, for example, define which steps are to be performed consecutively by the transfer device, whether a mailing is placed in the receptacle, whether a mailing is removed from the receptacle, the location where the mailing removed from the receptacle is transported to inside the vehicle, which mailing is placed in the receptacle, where said mailing is located, how access will be obtained to the receptacle, when the transfer device is stopped in order to prevent accidents and so on. Consequently, it is preferred if the taking of the mailing from, in particular out of, the vehicle and placement into the receptacle and/or the removal of the mailing from the receptacle and placement in, more particularly into, the vehicle is controlled at least in part by a control device in accordance with predefined criteria.

The transfer device can be started and/or stopped manually as required by the driver of the vehicle, to prevent objects from being damaged or people from being injured, for example. A mailing can also be selected independently by the transfer device as and where required, and without the involvement of a person, such as an operator or driver. Alternatively, or additionally, a mailing removed from a receptacle can also be deposited in the vehicle by the transfer device. No handling of mailings by the vehicle driver, for example, is required in this respect.

Alternatively, or additionally, at least one sensor, preferably on the vehicle, can detect the position of the receptacle relative to the vehicle in order to park the vehicle in a predefined relative alignment to the receptacle. The sensor can have at least one camera, which detects the receptacle. At least one further sensor can also be provided, which is able to determine the distance to the receptacle. Two or more cameras can also be provided where required, which together can determine not only the direction to the receptacle, but also the distance. The at least one sensor can ensure in any case that the vehicle is arranged in a position in which the transfer device is positioned and aligned relative to the receptacle, such that the transfer device can place the mailing into the receptacle or remove it from said receptacle.

At the same time, the at least one sensor can be attached to an approach device and consequently said approach device facilitates or controls the approach of the vehicle to the receptacle. It may be enough, depending on the requirements, to align the vehicle more or less with the receptacle, if the transfer device makes a fine adjustment to the respective position of the vehicle or transfer device relative to the receptacle. If the approach device is able to control the vehicle without the assistance of the driver, the vehicle can be aligned autonomously in a predefined manner relative to the receptacle, depending on the determined position of the receptacle relative to the vehicle. This is particularly straightforward. This also avoids driver error caused by inadequate alignment of the vehicle relative to the receptacle.

However, a person, such as a vehicle operator or driver, can intervene in the control of the transfer device where required. Said operator or driver can activate the transfer device after ensuring that this does not represent a risk of damage to specific items or injury to people passing by. This task is also performed by the transfer device itself where required, for which purpose said device can be provided with at least one appropriate sensor. The person can stop the transfer device for the same reasons where required, such as in cases where the transfer device is not configured such that said transfer device stops automatically if certain undesirable events or operating states occur.

If there is no autonomous alignment and/or positioning of the vehicle relative to the receptacle, information concerning the position of the receptacle relative to the vehicle can also be shown to the driver of the vehicle. The driver can then drive the vehicle easily and reliably up to the receptacle an appropriate manner. Said information could be provided by the approach device attached to the at least one sensor. For example, the current position of the vehicle relative to the receptacle is displayed or the direction in which the vehicle needs to be moved in order to adopt a satisfactory position relative to the receptacle.

Alternatively, or additionally, at least one sensor can be provided preferably on the vehicle and/or on the transfer device, which determines the position of the receptacle relative to the transfer device. At least one camera can be provided in the process, which detects the receptacle, and consequently the direction in which the receptacle is located in relation to the transfer device can be deduced. At least one further sensor can be provided to calculate the distance to the receptacle. Where required, the direction and distance to the receptacle can also be calculated using at least two cameras. If the position of the receptacle relative to the transfer device is calculated by means of the at least one sensor, the transfer device can be controlled, preferably autonomously, depending on the calculated position of the receptacle relative to the transfer device. In this manner, compensation can be made for any inaccurate positioning of the vehicle relative to the receptacle. Consequently, it can also be ensured that the mailing can be transferred to the receptacle and/or removed from the receptacle by the transfer device in a reliable manner.

How control of the transfer device takes place based on the information provided by the at least one sensor can be stipulated with the aid of the control device through predefined criteria. Said criteria can define, for example, the manner and direction in which the transfer device should approach the receptacle and/or where the transfer device should engage with the receptacle and in what manner.

The mailing can be transferred to the receptacle and/or from the receptacle to the vehicle in various ways, and controlled by the control device, where required. It is particularly easy if use is made of gravity to transport the mailing in order to save on additional drive mechanisms for instance. To simplify matters, this can be achieved by using at least one roller conveyor and/or a slide, for example. The mailing can be placed onto an inclined roller conveyor and held in place there in a form-fit position by a bar, for instance. If the mailing is released by readjusting the bar, the mailing moves downwards along the roller conveyor as required until said mailing is transported to the receptacle by a further device or reaches the receptacle. A slide can be used instead of or as well as a roller conveyor. However, said slide must be steep and smooth enough in order to enable the reliable transportation of mailings.

Alternatively, or additionally, the transfer device can have at least one gripper arm. The mailing can be transported by the gripper arm in an extremely precise manner from the vehicle to the receptacle or from the receptacle to the vehicle. The gripper arm can also easily compensate for any inaccurate positioning of the vehicle. Not least, the gripper arm can also be used to reach over any obstacle located between the receptacle and the vehicle. Essentially, preference is given at the same time to the gripper arm being able to be moved in three spatial directions vertical to each other, i.e. three dimensionally. The gripper arm can also grab the receptacle, which can be held in readiness by a holder of the receptacle, in order to bring the receptacle to the vehicle or even into the vehicle. The gripper arm can then return the receptacle to its holder.

However, alternatively or additionally, the gripper arm can also be used to grab a mailing inside the vehicle and transport the mailing to the receptacle as well as to grab a mailing in the receptacle and transport the mailing to the vehicle. In doing so, the mailings can be grabbed or deposited directly in the positions in which the mailings are stored in the vehicle. However, provision can also be made in order to save space that the mailings are transported by means of at least one further transport device from their storage location in the vehicle to a receiving location for the gripper arm. Alternatively or additionally, a mailing can be deposited at a hand over location by the gripper arm from where the mailing is transported to the storage location of the mailing in the vehicle with the aid of a further transport device. A plurality of gripper arms, more particularly two gripper arms, can be provided as required for several of the aforementioned tasks. In order to ensure the action of the at least one gripper arm in the manner required, criteria for operating states of the gripper arm can be predefined, which are required and/or should be avoided. The at least one gripper arm can then be controlled by means of the control device.

The transfer of a mailing from the vehicle to the receptacle can be simplified if the mailing is transported to a receiving location via a roller conveyor and/or a slide, where the mailing can be grabbed by the gripper arm. Alternatively, the gripper arm can move a mailing removed from a receptacle to a hand over location from which the mailing is then transferred by means of a roller conveyor and/or a slide, as required, to a location in the vehicle in which the mailing is stored until its removal from the vehicle.

If a mailing is placed into a receptacle and/or removed from a receptacle from in front, behind or from the side, the transfer device can be configured relatively easily in terms of design. If a mailing is placed into the receptacle and/or removed from the receptacle from above, this can be more costly in terms of design. However, obstacles between the vehicle and the receptacle are then more tolerable. It is also particularly easy if the mailing is removed from the receptacle from in front, behind, from the side or, more particularly from below, i.e. via the base of the receptacle, for example. In the latter case, gravity can be used and thus reliable emptying ensured.

In order to place a mailing in the receptacle and/or remove a mailing from the receptacle, said receptacle has an access unit, more particularly in the form of an opening, which enables access to the interior of the receptacle. In a particularly simple scenario, said access unit is an opening. The receptacle preferably has an access unit, which creates access to the interior of the receptacle measuring at least 10 cm in each direction, more particularly at least 20 cm. Alternatively or additionally, the space provided for the mailing in the interior of the receptacle measures at least 10 cm, more particularly at least 20 cm, in each spatial direction.

In order that a mailing in the receptacle is protected against external influences, closing means can be provided in order to close up the access unit. In the open position of the closing means, access to the interior of the receptacle is enabled, whilst in the closed position of the closing means, access to the interior of the receptacle is blocked. To simplify matters, in particular closing means in the form of a flap, slider and/or door are provided. In order that the access unit for placing the mailing in the closing means and/or for removing the mailing from the closing means can be opened easily, it is appropriate for the delivery and/or collection of the mailing if the receptacle, in particular a closing element is opened by an opening unit preferably the transfer device.

In order that the receptacle can be left in the closed position without difficulty using the closing means, alternatively or additionally, the receptacle can be closed after delivery and/or collection of the mailing by a closing unit, preferably the transfer device. To simplify matters, it is particularly preferred if the opening unit and the closing unit are the same unit, consequently an opening and closing unit.

In order that only authorised persons have access to a mailing, a closing mechanism can be provided for unlocking and/or locking the closing means from/to the receptacle, in particular by the transfer device. In the closed state of the closing mechanism, the closing means in the closed position is locked. In an open state of the closing mechanism, the closing means can also be placed into the open position in order to obtain access to the interior of the receptacle. In order to place the closing mechanism in the open state, a type of key, a code or other authorisation means may be required. The key, code and/or other authorisation means can be provided by the transfer device and consequently a person is not required to open the closing mechanism. The closing mechanism can be opened by means of a request by the receptacle and/or authorisation from the transfer device. The transfer device can have an RFID chip for this purpose, for instance, or, more particularly, send an access code to the receptacle via a radio signal. Essentially, the transfer device can provide authorisation information for the closing mechanism and/or send such information to the closing mechanism.

Insofar as a voltage supply is required for activation of the closing mechanism, this can be guaranteed by way of at least one battery.

Said battery can be a rechargeable battery where required, which is charged by means of a solar cell unit assigned to the receptacle. It may be more reliable, however, to provide the voltage supply through the transfer device, for example, inductively or through contact.

How the closing mechanism can be brought from the closed to the open state can be defined by means of criteria, according to which the control device controls the transfer device. The closing mechanism can operate not only electronically, but also mechanically, where required, using a type of key, from the transfer device for instance, which fits in a type of lock and thus operates the closing mechanism. The respective activation can also take place magnetically, through a magnet in the transfer device, for instance, if the latter is moved to a specific location in the receptacle. In the case of mechanical and/or magnetic operation, a voltage supply can be superfluous.

In order not to expose a mailing to weather conditions, such as rain or snow, when delivering to the receptacle and/or when collecting from the receptacle, the transfer device can remove the receptacle from, in particular out of, a holder of the receptacle and convey it at least in part to the vehicle. Preference is given for the reasons stated to conveying the receptacle right into the vehicle. It may be more advantageous for space reasons, however, if the receptacle is only conveyed partially into the vehicle. When the receptacle is at least partially in the vehicle, a mailing can be placed in the receptacle and/or removed from the receptacle. The use of a gripper arm is particularly appropriate for transporting the receptacle from the holder thereof until said receptacle is partially inside the vehicle and for transporting the receptacle from the vehicle back to the holder thereof. This can be controlled in a highly precise and flexible manner even if the vehicle is not ideally aligned in relation to the receptacle and/or obstacles are present between the receptacle and the vehicle. The placement into and/or removal of a mailing from the receptacle can be performed by means of a further gripper arm or another transport device.

In order that the receptacle can be held securely by the holder thereof and released without problem, the receptacle can be locked to and unlocked from the holder of the receptacle by a locking mechanism, and more particularly by the transfer device.

It may be particularly preferred if the locking mechanism is attached to a closing mechanism. In the closed state of the closing mechanism, the locking mechanism cannot be opened in order to release the receptacle. This is only possible in the open state. The closing mechanism can only be opened with the help of a key, a code or other authorisation means, such as an RFID chip, for instance. Where required, authorisation information can be held in readiness for the closing mechanism or sent to the closing mechanism. The closing mechanism will then only be opened following a successful check. Furthermore, to simplify matters, the closing mechanism can be activated by the transfer device. The closing mechanism can also be activated mechanically, where required, with a type of key from the transfer device, for instance, which fits in a type of lock and consequently activates the closing mechanism. The respective activation can also take place magnetically by means of a magnet in the transfer device for instance, if this is moved to a specific place in the receptacle. In the event of mechanical and/or magnetic activation, a voltage supply can be superfluous.

In order to simplify the delivery and/or collection of mailings, the vehicle can travel from at least one collection depot to at least one receptacle, and from at least one receptacle to a collection depot. The vehicle and, where required, other vehicles can then be loaded easily and efficiently with at least one mailing to be delivered. Alternatively or additionally, the at least one collected mailing can be unloaded at the collection depot. The mailing can then be transported as required together with other mailings from the collection depot to a receptacle. In order to increase efficiency, it is preferred if the vehicle is loaded with mailings at the same collection depot at which the mailing collected from the at least one user is unloaded. Essentially, it is preferred in this context if the vehicle drives autonomously from the collection depot to at least one receptacle and back to the collection depot again, or to another collection depot. No driver is required in such cases. Preferably, the approach of the vehicle to the receptacle should then also take place autonomously, as well as the removal of mailings from the receptacle and/or the placing of mailings into the receptacle, each time by means of the transfer device, since a driver or another person can then be dispensed with completely. However, a person can travel with the vehicle if required, who acts primarily in a supervisory role, and only actually intervenes in the control of the vehicle in order to prevent damage to property or injury to persons.

To increase efficiency and/or flexibility, several mailings can be placed into the receptacle and/or removed from the receptacle as mailing units. Thus, different mailings, more particularly different types of mailings (for example, letters, parcels and flyers) can also be delivered together. The same applies in principle to the collection of mailings.

With regard to mailings to be delivered, mailings can be combined into mailing units at a collection depot and then loaded together into the vehicle. Mailings can, however, also be loaded into the vehicle separately. The individual mailings can then be combined into a unit inside the vehicle. Mailings can also be placed into the receptacle individually and consequently the mailing unit is then combined firstly in the receptacle.

In order to store mailings in the vehicle and be able to place these into the receptacle more easily, mailings can be joined together and/or combined into a transport unit. Mailings can be joined together easily by placing the mailings, more particularly letters, into a bag, cardboard box or sack. These additional means can be closed as required. Alternatively or additionally, mailings can also be tied together using at least one tie. In both cases, the mailings can be stored in the vehicle in a space-saving manner. This is only partially true when using a transport unit in the form of a box or case (for example, made of cardboard or plastic). Consequently, in order to save space, it is preferred if transport units of different sizes or transport units with variable sizes are used. Transport units can simplify the storage and transport of mailings.

Since as many users as possible can be serviced in a short time using one vehicle, at least one mailing can be delivered to and/or collected from several receptacles. The vehicle drives to the receptacles one after the other on public roads at least in part. On reaching a receptacle, the mailing to be delivered is taken from, more particularly out of, the vehicle and placed in the respective receptacle by a transfer device permanently attached to the vehicle and/or the mailing to be collected is removed from the respective receptacle to, more particularly into, the vehicle by the transfer device permanently attached to the vehicle.

The vehicle can thus drive to a series of receptacles in the course of a round and deliver mailings to said receptacles and/or collect mailings for dispatch. A round can therefore be considered as a journey starting from a collection depot, driving to at least one receptacle belonging to a user and to a further collection depot or the collection depot from where the round began. Once all mailings transferred to the vehicle at the collection depot have been delivered and/or all mailings collected from the user receptacles have been placed in the vehicle, the vehicle drives back to a collection depot, which to simplify matters is the same collection depot from which the vehicle previously departed. Here, the mailings that have been collected can be unloaded and/or the mailings to be delivered next can be loaded into the vehicle.

The delivery of a mailing is simplified further if mailings are loaded into the vehicle in accordance with the scheduled order of receptacles to be visited. It makes particular sense if the order of mailings loaded matches the scheduled order in which receptacles are to be visited. The mailings then simply need to be unloaded in order, which simplifies unloading of the mailings in the correct order. If several mailings are to be delivered in the case of one or more receptacles, then the loading order or the order of loaded mailings, which are to be delivered to the same receptacle, can be essentially arbitrary.

Where required, the order of receptacles visited may deviate from the scheduled order of receptacles to be visited, so as to adapt the order of delivery to the current traffic situation, for example. In order to adjust the order in which mailings are delivered to the order in which the receptacles are actually visited, a correspondingly adjusted transport device, such as a transport belt or transport chain, can be provided which can be used to change the order of the mailings. All mailings can be attached to the transport device and/or moved using the transport device. For example, the required mailing can always be moved into a release position through an appropriate adjustment of the transport device. The respective mailing can be separated from the transport device there as required and then transferred to a receptacle. It is particularly preferred in the process if the transport device and/or the mailings can be moved in a circle, even though the transport device does not need to be configured circular. Consequently, only one transport device is required in order to always move the required mailing to the release position. The transport device can, however, also be moved in opposite directions where required i.e. forwards and backwards, for example. It is not then necessary for the mailings to be moved in a circle in order to always move the required mailing to the release position.

An area for storing a mailing in the vehicle could be assigned to each recipient or receptacle, however. The recipient to which a mailing should be delivered or which receptacle should be visited by the vehicle would then only need to be known. Consequently, the correct mailing can be placed into the receptacle. Here, there is no dependence or less dependence on the order of the mailings loaded or the order in which the mailings are loaded. This procedure makes it possible to change the route easily, based on the current traffic situation, for instance. It then has to be ensured, however, that the mailings can be made available in a different order for placement into the receptacles. Alternatively or additionally, the mailings removed from customer receptacles can be deposited in locations inside the vehicle that have become vacant following the delivery of other mailings. The mailings can be handled during unloading and/or loading in accordance with predefined criteria that can be based on the control of the transfer device by the control device.

The transfer device can be interpreted as a plurality of transport devices. At least one transport device can be provided, for example, which conveys a mailing from a storage location in the direction of the receptacle or right into the receptacle. At least one transport device can also be provided which transports a mailing as required from the receptacle to the storage location of the mailing in the vehicle. Consequently, alternatively or additionally, at least one transport device can also be provided to place the mailing in the receptacle and/or to remove the mailing from the receptacle. Moreover, at least one transport device can be provided to transport the receptacle from a holder of the receptacle to the vehicle and back, if the mailing is placed on or into the vehicle in the receptacle and/or removed from the receptacle on or in the vehicle.

BRIEF DESCRIPTION OF THE DRAWINGS

The invention is described in more detail below with the aid of one drawing showing just one embodiment.

DETAILED DESCRIPTION OF THE INVENTION

Figure 1:
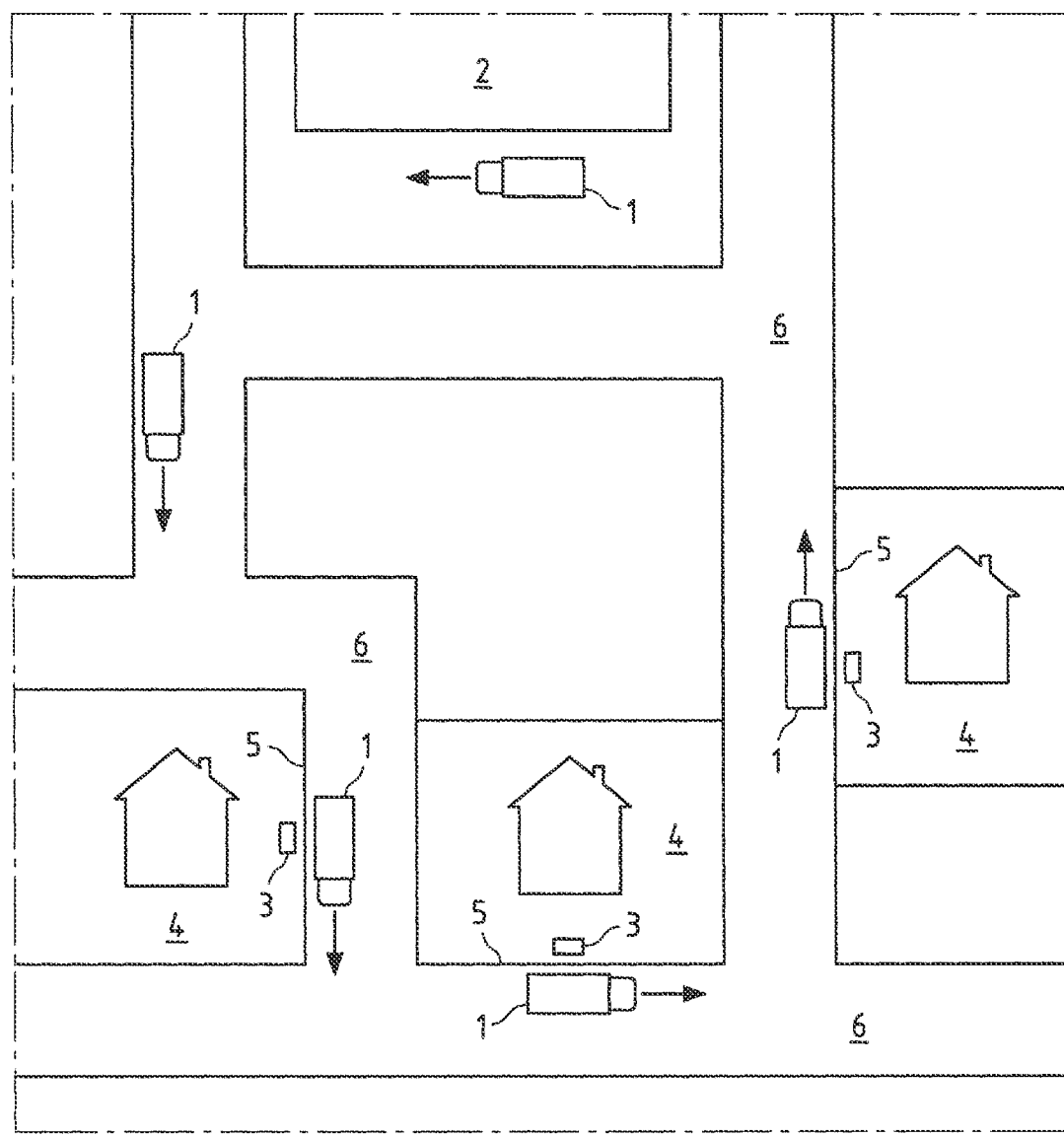
FIG. 1 shows a schematic representation of a method according to the invention.

FIG. 1 shows a schematic representation of a method for delivering and collecting mailings from a series of users with the aid of a vehicle 1. Firstly, the vehicle 1 is loaded with mailings at a collection depot 2, which are to be delivered to users. The mailings can be letters, parcels or flyers. Letters and flyers are bundled or stacked in a specific order in the method described and in this respect preferred. Letters and flyers can be removed in order from a stack on-site as required. On account of their potentially very different sizes, parcels are stowed separately in the vehicle 1, in a shelving system in vehicle 1, for instance. Alternatively, the letters and/or flyers destined for a user could also be stored in the vehicle already bundled.

The vehicle 1 loaded accordingly with a series of mailings now drives on public roads to each of the users in turn to whom the mailings are to be delivered. Beforehand, afterwards and/or in between, the vehicle 1 travels to other users, who have made at least one mailing available for collection, and thus for dispatch to the recipient of the respective mailing. The information about the users, who have made at least one mailing available, which is to be picked up by the vehicle 1, is made available to the vehicle 1 or to the driver. The order in which the vehicle 1 visits users to deliver and collect mailings is defined according to the route covered and the time required in order to improve the cost effectiveness of the method.

In the method shown, only three users are serviced on a route in order to improve the comprehensibility of this schematic representation. Naturally, service can also be provided to very many more users. The number of users depends on the population density and the size of the vehicle 1, for example.

The vehicle 1 now travels from the collection depot 2 to the receptacle 3 of the first user on the route. The vehicle 1 is driven close to the receptacle 3 by the driver, i.e. the delivery person, until the receptacle 3 is detected by at least one sensor in the form of a camera. Alternatively, the vehicle 1 can travel autonomously from the collection depot 2 to the user receptacles 3 and back to a collection depot, more particularly to the collection depot 2 at the starting point of the route.

In the method shown and preferred in this respect, the user receptacles 3 are located on the users' properties 4, and close to the property boundary 5 adjacent to an, in particular, public road 6. The vicinity of the receptacle 3 to the property boundary 5 is selected such that the receptacle 3 can be reached from the road 4 or at least from the pavement with the aid of the transfer device. In the cases where a property 4 does not border a public road 6 or a receptacle 3 cannot be conveniently provided on the property 4, receptacles 3 can also be provided at a different, more suitable location. The mailings must then be collected there or placed in the receptacles 3 there.

On reaching receptacle 3, the relative position of the vehicle 1 to the receptacle 3 and/or the relative position of the vehicle 1 to a position to be adopted by vehicle 1 is determined using the data from at least one sensor, more particularly from two cameras. Two cameras are provided for this purpose in the vehicle 1 shown and preferred in this respect. This information is now used to move the vehicle 1 autonomously into the position to be adopted by the vehicle 1. The position to be adopted by the vehicle 1 is predefined. The driver can monitor the approach of the vehicle 1 to the receptacle 3 in order to stop the vehicle 1, before the vehicle 1 collides with an obstacle not identified by vehicle 1, for example. In order to prevent collisions with obstacles, the vehicle 1 can be equipped with at least one further sensor, for instance a sensor calculating the distance from potential obstacles.

Once the predefined spatial relationship between the vehicle 1 and the receptacle 3 is achieved, the vehicle 1 stops. The transfer device can now be activated automatically or initiated by a triggering action on the part of the delivery agent, for instance by pressing a button. In the method shown and preferred in this respect, a transfer unit, which is part of the transfer device, in the form of a grabber, is deployed from the vehicle 1 in order to grab the receptacle 3 held in a holder of the receptacle 3. The transfer device has at least one sensor for this purpose, which detects the position of the receptacle 3 in relation to the transfer device, more particularly of the grabber. This means at least the detection of the direction in which the receptacle 3 is located relative to the transfer device, more particularly to the grabber. However, where required, the distance between the transfer unit, more particularly the grabber, and the receptacle 3 can be determined using a further sensor where appropriate. Where required, the information regarding the direction of the distance of the receptacle 3 from the grabber is calculated with the aid of two cameras. The grabber can be controlled in any case based on the position information by means of a control device such that the grabber can grab the receptacle 3 autonomously i.e. without involvement by the delivery agent.

The grabber actuates a closing mechanism in the process and brings this into an open position in which the closing mechanism releases a locking mechanism. In doing so, the grabber proves its authorisation to actuate the closing mechanism. At the same time or subsequently, the grabber brings the locking mechanism into an open position in which the lock between the holder of the receptacle 3 and the receptacle is released.

The receptacle is then drawn by the grabber into the vehicle 1. There, if not beforehand, a closing mechanism of the receptacle 3 is actuated by the opening unit of the transfer device and brought into the open state. Authorisation is performed here in advance where required which permits the opening of the closing mechanism of the receptacle 3. When the closing mechanism is open, locking means in the form of a flap or door of the receptacle 3 can be opened. This takes place inside the vehicle 1 by means of an opening unit of the transfer device in order to protect the mailings against weather conditions. The access unit in the form of an opening is released by way of the opened locking means for placement of the mailing into the receptacle 3.

Mailings are now placed into the open receptacle 3. The mailings are removed from storage in the vehicle 1 in the process. Which mailings need to be removed from the vehicle 1 is determined by the order in which the receptacles 3 are to be visited. The mailing to be delivered to the first user consists of two letters and a parcel. The letters are bundled together by a tie placed around the letters and are stored separately from the parcel in the vehicle 1. The bundle of letters and the parcel are placed into the open receptacle 3 separately by way of a conveyor mechanism, comprising a roller conveyor, for example, which is part of the transfer device. The doors of the receptacle 3 are then closed again by the closing unit of the transfer device and locked by the closing mechanism. The receptacle 3 is then returned to the holder of the receptacle 3 using the grabber. The grabber can now be drawn back into the vehicle 1 whereupon the vehicle 1 drives to the next receptacle 3.

The steps performed by the transfer device to deliver the mailing to the user are controlled by the control device in accordance with predefined criteria. Direct and exclusive control by the driver is therefore superfluous which overall leads to a simplification of the method.

Close to the receptacle 3 of the second user, detection of the receptacle 3 as well calculation of the distance of the receptacle 3 in relation to the vehicle 1 and calculation of the distance of the receptacle 3 in relation to the vehicle 1 takes place again and in the manner already described by means of the at least one sensor. Using the corresponding information, which is determined repeatedly, the vehicle 1 is controlled such that it aligns itself with the receptacle 3 in a predefined manner. The receptacle 3 is then removed from its holder in a sensor supported manner and controlled by the control device as has already been described above. Receptacle 3 also opens and closes in the manner previously described.

In contrast to the receptacle 3 of the first user, no mailing is transferred to the receptacle 3 of the second user. A parcel, which is ready for collection, is however removed from the receptacle 3 in order to send said mailing to the respective recipient. The information that a mailing is ready for collection from the respective receptacle 3 has been sent to the company involved by the second user and said company has passed this information on to the driver and/or to the vehicle 1. Alternatively or additionally, the receptacle makes information available about whether a mailing is ready for collection from the receptacle. Information can be registered by the driver and/or by a sensor. The information can be identifiable electronically or visually. For example, an RFID chip can provide information about a mailing that is ready for collection and said information can be read by the transfer device where required. Display means, in the form of a pennant, an index finger and/or coloured marking, can also be applied to the receptacle and/or placed in a specific position. The display means can thus indicate that a mailing is ready for collection. The mailing is removed from the receptacle 3 by tipping the receptacle 3 into the vehicle such that the mailing falls out of the receptacle 3 onto a transport device of the transfer device. The transport device moves the mailing to a location in the vehicle 1 where said mailing is stored until the vehicle 1 returns to the collection depot 2. The receptacle 3 is then turned round again and locked in the manner described and returned to the mounting attachment of the receptacle 3.

The vehicle 1 then drives to a receptacle 3 belonging to the third user. The vehicle 1 and the gripper approach the receptacle 3 in the same manner as already described. The same applies to the transfer of the receptacle 3 into the vehicle 1 as well as the opening of the receptacle 3. Since it is known that a mailing is ready for collection in the respective receptacle 3 and that two parcels are to be delivered to the receptacle 3, said receptacle 3 is firstly tilted in order to remove the mailing to be collected and transport it to a storage area in the vehicle 1 by way of the transport device. The receptacle 3 is then returned to an upright position and a transport device is enabled to transfer the mailings from the vehicle 1 into the receptacle 3. The mailings are stored together in a compartment of a shelving system in the vehicle 1 and are retrieved from said compartment together. The mailings are then transferred into the receptacle 3 by way of a roller conveyor.

The receptacle 3 is then closed in the manner described and returned to the holder of the receptacle 3. The vehicle 1 then drives back to the collection depot 2 where the mailings made ready for collection by the users and collected by the vehicle 1 are unloaded from the vehicle 1. The vehicle 1 is also loaded with the mailings to be delivered on the next round made by the vehicle 1, which takes place preferably on the next day. The vehicle 1 can then complete a further round which may be similar to the round described above.

FIGS. 2 A-D show a part of the method described above in more detail. The vehicle 1 approaches a receptacle 3 held in a U-shaped holder 7 as shown in FIG. 2A. An approach device is now activated by the delivery agent driving the vehicle 1. Said device comprises at least one sensor 8 in the form of two cameras, which detect the receptacle 3 and the holder 7 of the receptacle 3 respectively, and calculate the direction and distance of the vehicle 1 from the receptacle 3. Based on said data, the approach device moves the vehicle 1 to a position which meets predefined criteria regarding alignment and distance in relation to the vehicle 1 and receptacle 3 respectively. In a preferred embodiment, this takes place autonomously, i.e. without involvement on the part of the delivery agent who intervenes only in a supervisory or corrective capacity.

Figure 2A:
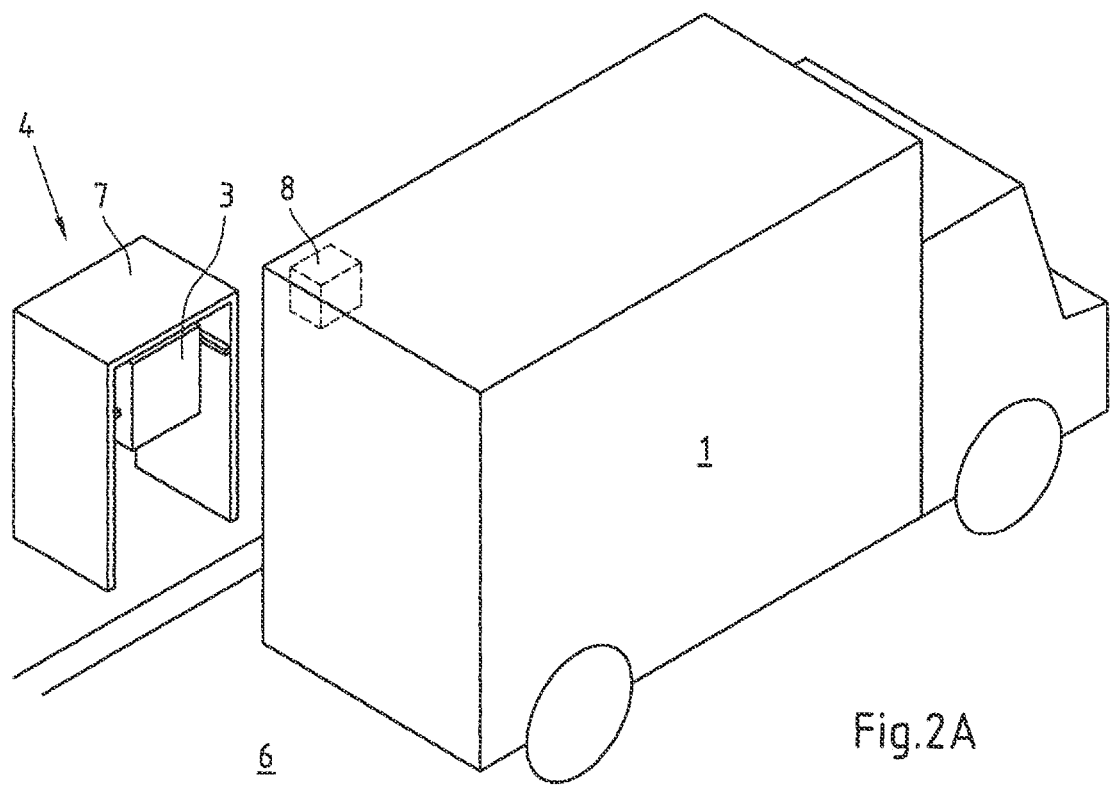
FIGS. 2 A-D show the delivery and collection of a mailing with the aid of the transfer device.
Figure 2B:
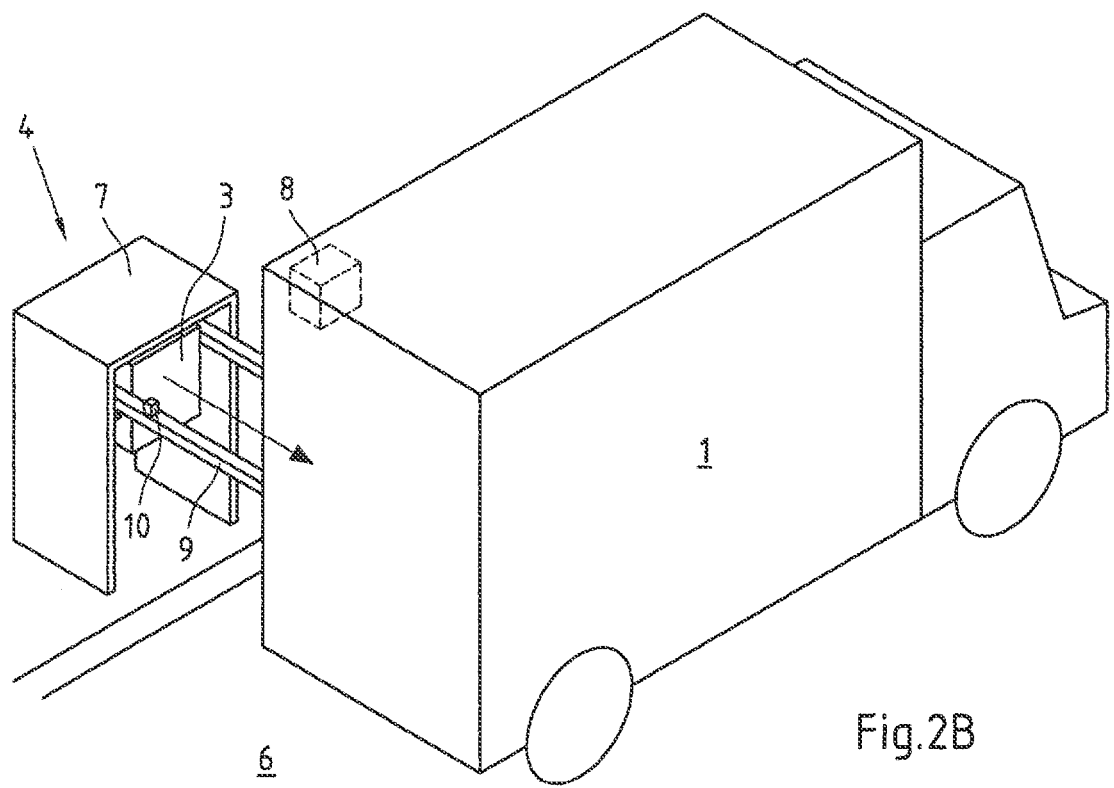

FIG. 2B shows that a gripper arm 9 of a transfer device permanently attached to the vehicle 1 is deployed from the vehicle 1, grabs the receptacle 3 and transports it into the vehicle 1. The transfer device is equipped with at least one sensor 10 for this purpose in order to calculate the distance and the direction between the transfer device and the receptacle 3 so that the receptacle 3 can be grabbed securely. The at least one sensor 10 is also configured as two cameras in this case. The transfer device opens the receptacle 3 with the aid of an opening unit.

Figure 2C:
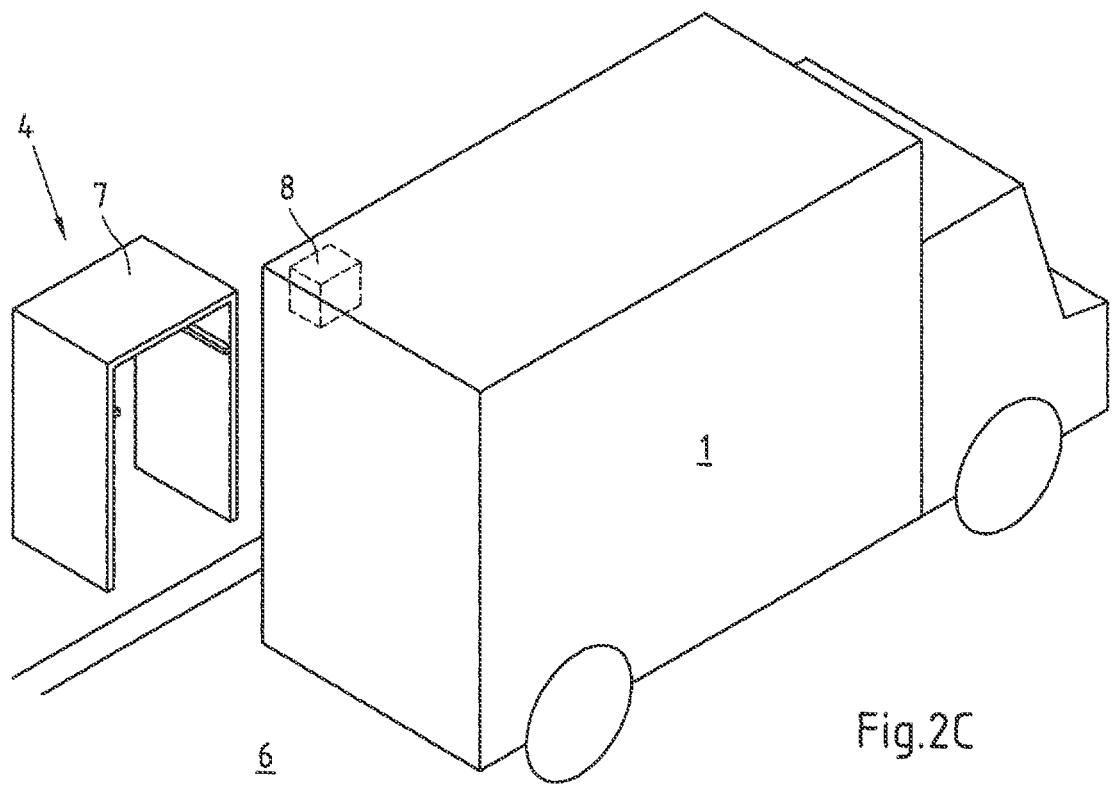

Whilst the receptacle 3 is located in the vehicle 1 according to FIG. 2C, a mailing is removed from the receptacle 3, where required, and transported to a storage location in the vehicle 1. A mailing can also be transported from a storage location in the vehicle 1 to the receptacle 3. A closing unit of the transfer unit closes the receptacle 3.

Figure 2D:
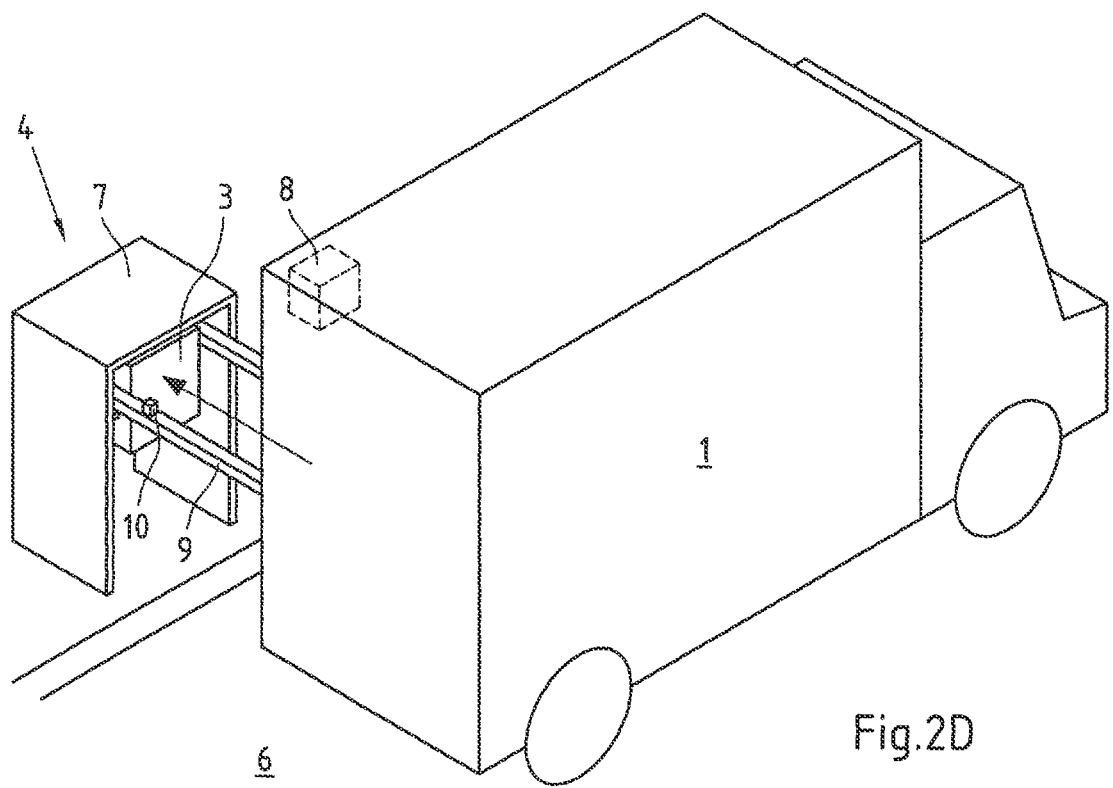

The receptacle 3 is then conveyed back to the holder 7 of the receptacle 3 using the gripper arm 9 and transferred to the holder 7 of the receptacle 3 as shown in FIG. 2D. This again takes place using the direction and distance information from the at least one sensor 10 on the gripper arm 9. The gripper arm 9 is then drawn back into the vehicle 1 again so that the vehicle 1 can move onto the receptacle 3 belonging to the next user. The removal of the receptacle 3 from the holder 7 of the receptacle 3 using the gripper arm 9, the removal of a mailing from the receptacle 3, where required, the placement of a mailing into the receptacle 3, where required, and the transfer of the receptacle 3 to the holder 7 of the receptacle 3 is controlled by a control device in accordance with predefined criteria and where required, based on information obtained by at least one sensor 8, 10. This takes place preferably in an autonomous manner.

The invention claimed is:

1. A method for delivery of at least one mailing, comprising the steps of
   driving a vehicle to at least one receptacle through public traffic at least in part,
   taking the at least one mailing to be delivered from the vehicle and placing the at least one mailing to be delivered into the at least one receptacle by a transfer device attached to the vehicle,
   wherein, prior to the steps of taking and placing, the transfer device removes the at least one receptacle from a holder of the at least one receptacle and conveys it into the vehicle at least in part, and
   wherein the step of placing the at least one mailing into the at least one receptacle occurs when said at least one receptacle is located in the vehicle at least in part.

2. The method according to claim 1,
   in which a mailing of said at least one mailing is taken from the vehicle and placed into the receptacle by the transfer device and/or
   in which a mailing of said at least one mailing is brought from the at least one receptacle into the vehicle by the transfer device.

3. The method according to claim 1,
   in which the vehicle drives to the at least one receptacle provided on the edge of a property adjacent to a road.

4. The method according to claim 1,
   in which the vehicle stops adjacent to a property, more particularly at a curbside.

5. The method according to claim 1,
   in which the removal of a mailing of said at least one mailing out of the vehicle into the at least one receptacle by means of the transfer device and/or the removal of a mailing of said at least one mailing from the at least one receptacle into the vehicle by means of the transfer device is controlled by a control device at least in part.

6. The method according to claim 1,
   in which the removal of a mailing of said at least one mailing out of the vehicle into the at least one receptacle by means of the transfer device and/or the removal of a mailing of said at least one mailing from the at least one receptacle into the vehicle by means of the transfer device is performed autonomously at least in part.

7. The method according to claim 1,
   in which the removal of a mailing of said at least one mailing out of the vehicle into the at least one receptacle by means of the transfer device and/or the removal of a mailing of said at least one mailing from the at least one receptacle into the vehicle by means of the transfer device is controlled according to predefined criteria at least in part.

8. The method according to claim 1,
   in which at least one sensor determines the position of the at least one receptacle relative to the vehicle and
   in which the vehicle, depending on the determined position of the at least one receptacle, relative to the vehicle, is positioned relative to the at least one receptacle in a predefined manner.

9. The method according to claim 8,
   in which information concerning the position of the at least one receptacle relative to the vehicle is displayed to a driver of the vehicle.

10. The method according to claim 1,
    in which at least one sensor determines the position of the at least one receptacle relative to the transfer device and
    in which the transfer device is controlled depending on the determined position of the at least one receptacle relative to the transfer device, in order to remove a mailing of said at least one mailing out of the vehicle and place it into the at least one receptacle and/or to remove a mailing of said at least one mailing from the at least one receptacle into the vehicle.

11. The method according to claim 1,
    in which a mailing of said at least one mailing making use of gravity, is placed into the at least one receptacle and/or removed from the at least one receptacle and placed into the vehicle.

12. The method according to claim 1,
    in which at least one gripper arm of the transfer device is used to grab the at least one receptacle, to transport the at least one receptacle to the vehicle, to transport the at least one receptacle to the holder of the at least one receptacle or another holder in another location, to place a mailing of said at least one mailing into the at least one receptacle, to remove a mailing of said at least one mailing from the at least one receptacle, to grab a mailing of said at least one mailing made ready in the vehicle and/or to deposit a mailing of said at least one mailing removed from the at least one receptacle in the vehicle.

13. The method according to claim 1,
in which a mailing of said at least one mailing is placed into the at least one receptacle from above, from in front, from behind and/or from the side.

14. The method according to claim 1,
in which a mailing of said at least one mailing is removed from the at least one receptacle from above, from the front, from behind, from the side and/or from below.

15. The method according to claim 1,
in which a mailing of said at least one mailing is placed into the at least one receptacle and/or removed from the at least one receptacle through an access unit in the form of an opening, preferably having dimensions of at least 10 cm.

16. The method according to claim 1,
in which a closing means for closing an access unit, is opened by an opening unit, preferably the transfer device, for delivery and/or collection of a mailing of said at least one mailing.

17. The method according to claim 1,
in which a closing means for closing an access unit, is closed by a closing unit, preferably the transfer device, following the delivery and/or collection of a mailing of said at least one mailing.

18. A method for delivery of at least one mailing, comprising the steps of:
driving a vehicle to at least one receptacle through public traffic at least in part,
taking the at least one mailing to be delivered from the vehicle and placing the at least one mailing to be delivered into the at least one receptacle by a transfer device attached to the vehicle,
wherein, prior to the steps of taking and placing, the transfer device removes the at least one receptacle from a holder of the at least one receptacle and conveys it into the vehicle at least in part,
wherein the step of placing the at least one mailing into the at least one receptacle occurs when said at least one receptacle is located in the vehicle at least in part, and
wherein a closing mechanism to lock a closing means to the at least one receptacle and/or to unlock the closing means from the at least one receptacle is activated by the transfer device.

19. A method for delivery of at least one mailing, comprising the steps of:
driving a vehicle to at least one receptacle through public traffic at least in part,
taking the at least one mailing to be delivered from the vehicle and placing the at least one mailing to be delivered into the at least one receptacle by a transfer device attached to the vehicle,
wherein, prior to the steps of taking and placing, the transfer device removes the at least one receptacle from a holder of the at least one receptacle and conveys it into the vehicle at least in part,
wherein the step of placing the at least one mailing into the at least one receptacle occurs when said at least one receptacle is located in the vehicle at least in part, and
wherein a locking mechanism to lock the at least one receptacle to the holder of the at least one receptacle and/or to unlock the at least one receptacle from the holder of the at least one receptacle is activated by the transfer device.

20. The method according to claim 19,
in which a closing mechanism to lock the locking mechanism and/or to unlock the locking mechanism from the at least one receptacle is activated by the transfer device.

21. The method according to claim 1,
in which the vehicle drives from at least one collection depot to the at least one receptacle and from the at least one receptacle to a, preferably the same, collection depot and
in which the vehicle is loaded with the at least one mailing to be delivered at the collection depot and/or the at least one mailing that has been collected is unloaded from the vehicle at the collection depot.

22. The method according to claim 21,
in which several mailings 1 of said at least one mailing at the collection depot, in the vehicle or in the receptacle are combined into one mailing unit to be placed into the same receptacle of said at least one receptacle.

23. The method according to claim 1,
in which several mailings of said at least one mailing are attached to each other and/or combined in a transport unit, preferably of variable size.

24. The method according to claim 1,
in which several mailings of said at least one mailing are delivered and/or collected,
in which a vehicle drives to several receptacles of said at least one receptacle one after the other through public traffic at least in part and
in which the at least one mailing is taken out of the vehicle by the transfer device attached to the vehicle and placed into at least one receptacle and/or at least one mailing is removed from the at least one receptacle into the vehicle by the transfer device attached to the vehicle.

25. The method according to claim 24,
in which the vehicle is loaded with the several mailings of said at least one mailing in accordance with a scheduled order of the receptacles of said at least one receptacle to be visited.

26. The method according to claim 24,
in which the order of the receptacles of said at least one receptacle visited differs from a scheduled order of the receptacles of said at least one receptacle to be visited.

27. The method according to claim 1,
in which a mailing of said at least one mailing is placed into the at least one receptacle and/or removed from the at least one receptacle through an access unit.

* * * * *